US008472657B2

(12) United States Patent
Singh

(10) Patent No.: US 8,472,657 B2
(45) Date of Patent: Jun. 25, 2013

(54) FORMING A GEOMETRIC STRUCTURE IN A DEVICE HOUSING TO EXTERNALLY PROVIDE A HARDWARE ELEMENT OF A MOBILE TELECOMMUNICATION DEVICE

(76) Inventor: Sanjeev Kumar Singh, Danbury, CT (US)

( * ) Notice: Subject to any disclaimer, the term of this patent is extended or adjusted under 35 U.S.C. 154(b) by 65 days.

(21) Appl. No.: 13/275,444

(22) Filed: Oct. 18, 2011

(65) Prior Publication Data

US 2012/0058802 A1    Mar. 8, 2012

Related U.S. Application Data

(63) Continuation of application No. 11/563,429, filed on Nov. 27, 2006, now Pat. No. 8,059,853.

(51) Int. Cl.
*H04R 1/00*    (2006.01)
*H04R 9/06*    (2006.01)

(52) U.S. Cl.
USPC ............................... 381/370; 381/335

(58) Field of Classification Search
USPC ...... 381/309, 370, 335; 361/679; 379/428.01, 379/428.04, 430, 433.02, 433.03, 433.05, 379/433.11; 455/569.1
See application file for complete search history.

(56) References Cited

U.S. PATENT DOCUMENTS

| 4,445,005 | A | 4/1984 | Furuhashi |
| 6,698,560 | B2 | 3/2004 | Reardon et al. |
| 2003/0165237 | A1 | 9/2003 | Farr et al. |
| 2005/0107131 | A1* | 5/2005 | Abramov .................... 455/569.1 |
| 2006/0246961 | A1* | 11/2006 | Wang ......................... 455/569.1 |

OTHER PUBLICATIONS

Non-Final Rejection mailed Feb. 7, 2011 for U.S. Appl. No. 11/563,429, filed Nov. 27, 2006, 13 pages.
Notice of Allowance mailed Sep. 8, 2011 for U.S. Appl. No. 11/563,429, filed Nov. 27, 2006, 5 pages.

* cited by examiner

*Primary Examiner* — Brian Ensey
(74) *Attorney, Agent, or Firm* — Sanjeev K. Singh

(57) ABSTRACT

In one illustrative embodiment, a functional device hardware element of a mobile telecommunication device is provided externally by forming a dual geometric structure in an exterior surface of at least two device side edges of a device housing. The device housing has first and second grooves being substantially disposed from the front surface to the back surface across the side circumferential surface of first and second device edges of at least four device side edges, respectively, such that a combination of the first and second grooves is configured to jointly define at least one of a shape and a size of a predefined geometric structure that is selected to externally form a functional device hardware element of the mobile telecommunication device from the device housing of the device body.

34 Claims, 6 Drawing Sheets

FORMING A GEOMETRIC STRUCTURE IN A DEVICE HOUSING TO EXTERNALLY PROVIDE A HARDWARE ELEMENT OF A MOBILE TELECOMMUNICATION DEVICE

CROSS REFERENCE TO RELATED APPLICATIONS

This application is a continuation application of U.S. Ser. No. 11/563,429, filed Nov. 27, 2006, which is incorporated by reference herein in its entirety.

BACKGROUND OF THE INVENTION

1. Field of the Invention

This invention relates generally to hand-held, portable electronic devices, and more particularly, to externally providing a hardware element of a mobile telecommunication device by forming a geometric structure in a device housing to enable a device functionality.

2. Description of the Related Art

Increasingly use to hand-held, portable electronic devices, such as a processor or controller based devices including hand-held, portable computers, hand-held multi-media players, music players, cellular phones, hand-held wired and/or wireless communication and/or computing devices, hand-held pocket computers, and personal digital assistants is becoming widely popular. As a result, use and exchange of electronic entertainment content and information is not only a trend anymore but a norm and a convenient way of experiencing multi-media content such as music and video, conveying information including electronic mail messages between users of wired and/or mobile communication devices. Many commercial enterprises, media service providers or network operators, Internet service providers and businesses use Internet to disseminate electronic multi-media content (textual, graphic, music and video files) over a connected mesh of wired and/or wireless network users. For example, several of these entities usually provide access to multi-media content and services on the Internet via websites and web browsers.

Users of the hand-held, portable electronic devices obtain and store a variety of electronic multi-media content such as music and video files on their hand-held, portable devices. Likewise, users of networked devices wired and/or wireless exchange electronic messages to communicate with other users. To use the hand-held, portable electronic devices, an audiophone comprising headphone(s) and/or microphone is provided for users. In general, for listening to electronic multi-media content such as music and video files, a pair of stereo headphones is provided with the hand-held, portable electronic devices. For the hand-held, portable networked, wired and/or wireless communication and/or computing devices, a headphone with a microphone is provided. Examples of headphones and/or microphones include a wired or a wireless set of audio devices.

While the wireless headphones and/or microphones comprise a headphone and/or a microphone, the wired headphone(s) and/or microphone comprise a pair of stereo audio cords with a set of micro headphones at one end and an audio male connector pin on the other end, both face a similar set of issues relating to their storage for reuse, i.e., when not being used by users. In particular, the audio cords are a few feet long so that a user can conveniently use the headphones and/or microphones. Since these audio cords are relatively soft and flexible they get entangled when the headphones and/or microphones are not being used. That is, storage of the headphones and/or microphones with a relatively long and flexible audio cord with headphone speaker(s) attached to its end is a messy affair. With regard to the wireless headphones and/or microphones, because of their wireless convenience it is relatively easy to misplace, damage, or loose them when they are not being in use. In this manner, storage for reuse of both the wired and/or wireless headphones and/or microphones of the hand-held, portable electronic devices becomes quite a challenge when an audiophone is not put to use by users.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a mobile telecommunication device comprises a cellular transceiver, a short-range wireless transceiver, one or more processors, a flash memory to store user data and user applications (APPs), an interactive touch screen user interface, a display and a device body including a device housing. The device housing may include a side circumferential surface on at least four device edges and front, back surfaces. The device housing may have a first groove being substantially disposed from the front surface to the back surface across the side circumferential surface of one device edge of the at least four device edges and a second groove being substantially disposed from the front surface to the back surface across the side circumferential surface of another device edge of the at least four device edges, different than the one device edge such that a combination of the first and second grooves is configured to jointly define at least one of a shape and a size of a predefined geometric structure that is selected to externally form a functional device hardware element of the mobile telecommunication device from the device housing of the device body.

In another embodiment of the present invention, a method is provided for externally providing a device functionality in a mobile telecommunication device. The method comprises providing a cellular transceiver, providing a short-range wireless transceiver, providing one or more processors, providing a flash memory to store user data and user applications (APPs), providing an interactive touch screen user interface, providing a display, and providing a device body including a device housing, wherein the device housing including a side circumferential surface on at least four device edges and front, back surfaces. The method further includes forming a first groove across the side circumferential surface of one device edge of the at least four device edges, wherein the first groove being substantially disposed from the front surface to the back surface. The method further includes forming a second groove across the side circumferential surface of another device edge of the at least four device edges, different than the one device edge, wherein the second groove being substantially disposed from the front surface to the back surface such that a combination of the first and second grooves is configured to jointly define at least one of a shape and a size of a predefined geometric structure that is selected to externally form a functional device hardware element of the mobile telecommunication device from the device housing of the device body.

BRIEF DESCRIPTION OF THE DRAWINGS

The invention may be understood by reference to the following description taken in conjunction with the accompanying drawings, in which like reference numerals identify like elements, and in which.

Figure 1:
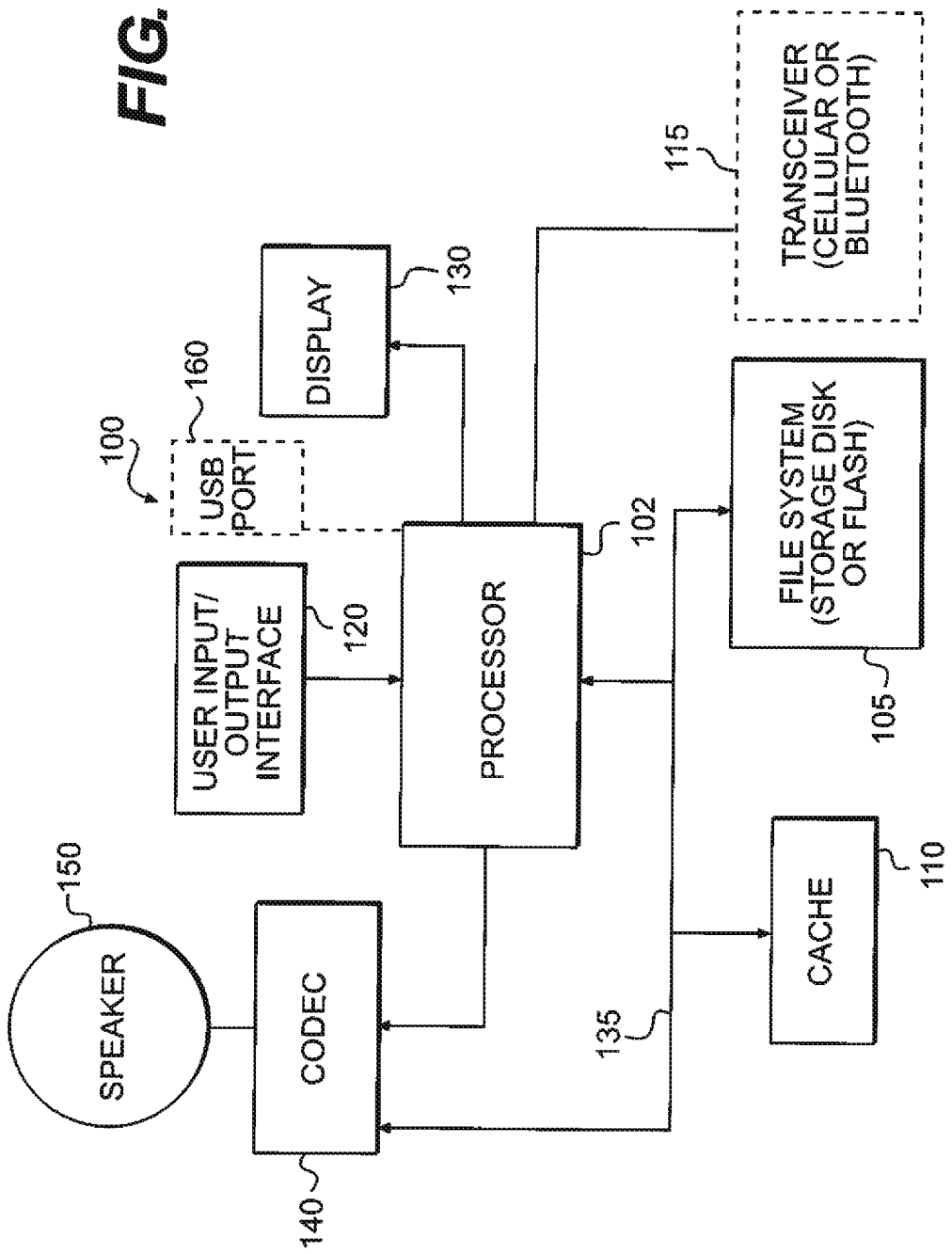
FIG. 1 schematically illustrates a hand-held, portable electronic device including a retainer assembly to removably retain an audiophone capable of coupling for communicating to the hand-held, portable electronic device having device body and device housing with a surface in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a functional device hardware element of a mobile telecommunication device is provided externally by forming a dual geometric structure in an exterior surface of at least two device side edges of a device housing. The mobile telecommunication device includes both cellular and short-range transceivers, a flash memory, an interactive touch screen user interface, one or more processors, a display and a device body with a device housing. The device housing includes a side circumferential surface on at least four device edges and front, back surfaces. The device housing has a first groove being substantially disposed from the front surface to the back surface across the side circumferential surface of a first device edge of the at least four device edges. And it has a second groove being substantially disposed from the front surface to the back surface across the side circumferential surface of a second device edge of the at least four device edges, different than the first device edge such that a combination of the first and second grooves is configured to jointly define at least one of a shape and a size of a predefined geometric structure that is selected to externally form a functional device hardware element of the mobile telecommunication device from the device housing of the device body.

According to one illustrative embodiment of the present invention, a method and an apparatus are provided for retaining an audiophone including at least one of a headphone and a microphone on a hand-held, portable electronic device having device body and device housing with a surface. In one embodiment of the present invention, a retainer assembly may use the device body and or device housing with a surface to retain the audiophone along with the hand-held, portable electronic device. The retainer assembly may removably receive an audiophone including a headphone(s) and/or a microphone at the hand-held, portable electronic device. For retaining the audiophone with an associated flexible audio cord, the retainer assembly may comprise at least a portion of the device housing that includes one or more threaded grooves on the surface of the device housing. The threaded grooves may hold with the hand-held, portable electronic device the audiophone and the flexible audio cord that connects the headphone(s) and/or a microphone at a first cord end to a connector pin at a second cord end opposite the first cord end. In another embodiment of the present invention, a method is provided for providing a retainer assembly to retain an audiophone including the headphone and/or microphone on a hand-held, portable electronic device having device body and device housing with a surface. The method comprises forming one or more threaded grooves on at least a portion of the surface of the device housing for the retainer assembly to removably receive the audiophone for holding it over the device body along with a flexible audio cord that connects the headphone(s) and/or microphone at a first cord end to a connector pin at a second cord end opposite the first cord end. In this way, a retainer assembly may removably retain an audiophone capable of coupling for communicating with a hand-held, portable electronic device as a pair together for storage and reuse. For example, by using the surface of the housing and/or body of an audio music player, an audiophone retainer assembly may removably store an attachable pair of headphones along with the audio music player capable of storing and playing MP3 music files. That is, the retainer assembly may externally store the headphones over the surface of the audio music player housing and/or internally on the body of the audio music player.

Referring to FIG. 1, a hand-held, portable electronic device 100 that may removably retain an audiophone (not shown) capable of coupling for communicating therewith is illustrated according to one embodiment of the present invention. As set forth below, by using the body and/or housing surface of the hand-held, portable electronic device 100, it may retain the audiophone, which may include a headphone(s) and/or a microphone with an associated flexible audio cord (not shown) that connects the headphone(s) and/or a microphone at a first cord end to a connector pin at a second cord end opposite the first cord end. For example, the audiophone 205 may comprise two stereo headphones 205a and 205b.

Examples of the hand-held, portable electronic device 100 include consumer electronics products such as a processor or controller based devices including hand-held, portable computers, hand-held multi-media players, music players, cellular phones, hand-held wired and/or wireless communication and/or computing devices, hand-held pocket computers, and personal digital assistants (PDAs), a game player, a video player, a video recorder, a camera, an image viewer and the like. A hand-held device may be sized for placement into a pocket or hand of the user and no reference surface such as a desktop is desired to operate it. By being hand-held, the hand-held, portable electronic device 100 is relatively small and easily handled and utilized by its user. Unlike a laptop computer, by being portable it is pocket sized; the user may carry the hand-held, portable electronic device 100 in hand and avoid carrying a relatively large bag for a bulky and often heavy device. A battery (not shown), an AC adapter, or a vehicle adapter may power the hand-held, portable electronic device 100. Since the hand-held, portable electronic device 100 is battery operated and highly portable, a user may listen to music, play games or video, record video or take pictures or wirelessly communicate wherever the user travels.

The hand-held, portable electronic device 100 may include a processor 102 that may control the overall operation of the hand-held, portable electronic device 100. The hand-held, portable electronic device 100 may store media content pertaining to multi-media items in a file system 105 and a cache 110, for example, for example, semiconductor memory such as Random-Access Memory (RAM). Examples of the media content include electronic entertainment content and information such as music, video, electronic mail messages. The hand-held, portable electronic device 100 may interface with computers, commercial enterprises, media service providers or network operators, Internet service providers and businesses using Internet to obtain and/or disseminate electronic multi-media content (textual, graphic, music and video files) over a connected mesh of wired and/or wireless network users. For example, a user of the hand-held, portable electronic device 100 may access multi-media content and services wirelessly or on wired communication medium on the Internet via websites and web browsers.

Consistent with one embodiment, the file system 105 may comprise a storage disk or a plurality of disks to provide high capacity storage capability for the hand-held, portable electronic device 100. However, the file system 105 of the hand-held, portable electronic device 100 may comprise a non-volatile semiconductor memory device such as FLASH memory. For wireless communications, the hand-held, portable electronic device 100 may comprise a transceiver 115, for example, a cellular transceiver or a short-range Bluetooth transceiver provided to communicate with the audiophone and/or an access point.

In some embodiments, a first transceiver, i.e., the transceiver 115 may be adapted to communicate with the audiophone 205 over a wireless communication link. The audiophone 205 may include a second transceiver adapted to connect the hand-held, portable electronic device 100 with the audiophone 205 using the wireless communication link. For illustrative purposes, in one embodiment, a communications system may be a digital cellular network, although it should be understood that the present invention may be applicable to other systems that support data and/or voice communication. The communications system may allow the hand-held, portable electronic device 100 to communicate with a data network, such as the Internet, through one or more base stations (BTS). The hand-held, portable electronic device 100 may take the form of any of a variety of devices capable of accessing the data network through the BTS. In one embodiment, a plurality of the BTSs may be coupled to a Radio Network Controller (RNC) by one or more connections, such as T1/EI lines or circuits, ATM circuits, cables, optical digital subscriber lines (DSL's), and the like. Generally, the RNC operates to control and coordinate the BTSs to which it is connected. The RNC is, in turn, coupled to a controller (CN) via a connection, which may take on any of a variety of forms, such as T1/EI lines or circuits, ATM circuits, cables, optical digital subscriber lines, and the like.

The data network may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like. As utilized herein, a "data network" may refer to one or more communication networks, channels, links, or paths, and systems or devices (such as routers) used to route data over such networks, channels, links, or paths. It should be understood that the configuration of the communications system may include a network management system (not shown) that provides operation, administration, maintenance, and provisioning functions for a cellular network.

In other embodiments, Bluetooth may enable the hand-held, portable electronic device 100 to communicate over wireless personal area networks (PANs). Bluetooth provides a way to connect and exchange information between devices such as mobile phones, laptops, PCs, printers, digital cameras and video game consoles via a secure, globally unlicensed short-range radio frequency. By using short-range radio frequencies Bluetooth may enable two or more devices, for example, the hand-held, portable electronic device 100 to communicate with another device in close proximity. For example, the audiophone 205 may be a Bluetooth headset capable of transferring files from phones/PDAs to computers. The Bluetooth specification is available from Bluetooth Special Interest Group (SIG) or as IEEE standard 802.15.1. Alternatively, Wi-Fi may be used in the hand-held, portable electronic device 100 to communicate on the same radio frequencies as Bluetooth, but with higher power consumption resulting in a stronger connection. Wi-Fi is sometimes called "Wireless Ethernet". Bluetooth and/or Wi-Fi may be used in the hand-held, portable electronic device 100 within offices, homes and on the move by setting up networks, printing, or transferring presentations and files from PDAs to computers.

For the purposes of enabling a user of the hand-held, portable electronic device 100 to interact with the hand-held, portable electronic device 100, the hand-held, portable electronic device 100 may include a user input/output (I/O) interface 120. For example, the user I/O interface 120 can take a variety of forms including a button(s), keypad, joy stick, touch screen button(s), and dial(s). The hand-held, portable electronic device 100 may further include a display 130 (display screen). To display information to the user, the processor 102 may control the display 130 of the hand-held, portable electronic device 100. A data bus 135 may internally couple one or more components including the file system 105, the cache 106, and a coder/decoder (CODEC) 140 within the hand-held, portable electronic device 100 to the processor 102 for transferring data therebetween. The hand-held, portable electronic device 100 may include a Universal Serial Bus (USB) port 160 for interfacing with external devices, such as computers or a base unit. In this way, a user may store a plurality of media items (e.g., songs) in the file system 105.

In operation, a user of the media player may display a list of available media items on the display 130 to play a particular media item. By using the user I/O interface 120, a user can select one of the available media items. The processor 102, upon receiving a selection of a particular media item, supplies the media data (e.g., audio file) for the particular media item to the CODEC 140. The CODEC 140 then produces analog output signals for a speaker 150. The speaker 150 can be a speaker internal to the handheld, portable electronic device 100 or external to the hand-held, portable electronic device 100. For example, headphones or earphones that connect to the hand-held, portable electronic device 100 would be considered an external speaker. Accordingly, the processor 102 controls the playing of the particular media item such that upon receiving the user's selection of the particular media item, such as music file in Moving Picture Experts Group (MPEG)-1 Audio Layer 3 (MP3) format or MPEG-4 format based on International Organization for Standardization (ISO)/International Electro-technical Commission (IEC) JTC1/SC29 WG11 standard or M-JPEG used by Internet Protocol (IP) based video cameras via Hypertext Transfer Protocol (HTTP) streams by using multipart and/or mixed content type.

Consistent with one embodiment, a video coder/decoder (VODEC) (not shown) may be likewise included in the hand-held, portable electronic device 100 to play video items or image files, such as a video file in Windows Media Format (*.wma file) or in a Joint Photographic Experts Group (JPEG) based on JPEG 2000: Image Compression Standards available from International Organization for Standardization (ISO) or MPEG format, or DivX Media Format (*.divx). Another example is a (*.wav), short for Waveform audio format that is a Microsoft and IBM audio file format standard for storing audio on personal computers (PCs). Other examples include the Resource Interchange File Format (RIFF) bit stream format for storing data in "chunks," the Interchange File Format (IFF) and the Audio Interchange File Format (AIFF) format used on Apple Macintosh computers.

Figure 2:
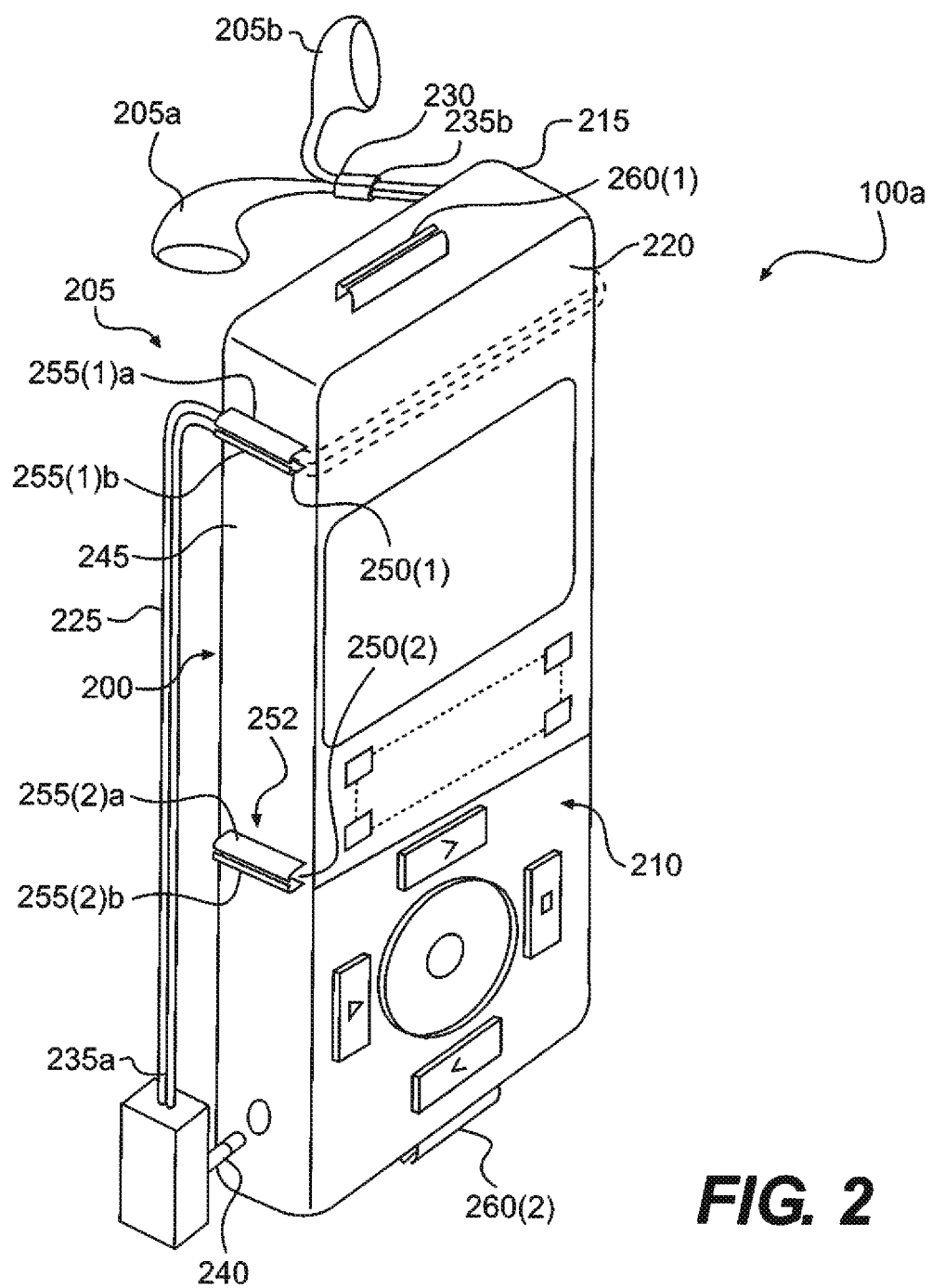
FIG. 2 schematically illustrates a perspective view of a hand-held, portable electronic device including a retainer assembly to removably retain an audiophone capable of coupling for communicating to the hand-held, portable electronic device having device body and device housing with a surface in accordance with one embodiment of the present invention.

Turning now to FIG. 2, a hand-held, portable electronic device 100a is shown in a perspective view to include a retainer assembly 200 according to one illustrative embodiment of the present invention. The retainer assembly 200 may removably retain an audiophone 205 capable of coupling for communicating to the hand-held, portable electronic device 100a. The hand-held, portable electronic device 100a may comprise device body 210 and device housing 215 with a surface 220. By using the surface 220 of the device housing 215 and/or the device body 210, the retainer assembly 200 may removably receive the audiophone 205 along with an associated flexible audio cord 225 for holding together as a pair with the hand-held, portable electronic device 100a. The audiophone 205 may include a headphone(s) 230 and or a microphone (not shown) with the flexible audio cord 225 that connects the headphone(s) 230 and/or microphone at a first cord end 235a to a connector pin 240 at a second cord end 235b opposite the first cord end 235a.

For retaining the audiophone 205 and the associated flexible audio cord 225, the retainer assembly 200 may comprise at least a portion 245 of the device housing 215 that includes one or more threaded grooves 250(1-n) on the surface 220 of the device housing 215. The threaded grooves 250(1-n) may securely hold the audiophone 205 and the flexible audio cord 225 with the hand-held, portable electronic device 100. The threaded grooves 250(1-n) may form a cord receptacle 252 for receiving the flexible audio cord 225 on the device housing 215 of the hand-held, portable electronic device 100a. In one embodiment, the portion 245 of the device housing 215 may include at least one of two threaded grooves 250(1, 2) each having a pair of opposing notches 255(1)a, 255(1)b and 255(2)a, 255(2)b. For example, one pair of opposing notches 255(1)a, 255(1)b may be sized based on the diameter size of the flexible audio cord 225 to securely latch the first cord end 235a therein. Likewise, the other pair of opposing notches 255(2)a, 255(2)b may be sized to securely retain or hold the second cord end 235b therein.

However, when the connector pin 240 at the first cord end 235a is to be kept plugged or retained in a position that causes it to stay latched but unconnected, one of the two threaded grooves 250(1, 2) may be used or provided for the retainer assembly 200 for holding the audiophone 205. Upon reeling the flexible audio cord 225 over the device housing 215, the user may keep the audiophone 205 together with the hand-held, portable electronic device 100. For example, the threaded groove 250(1) may be flexibly receiving the flexible audio cord 225 for retaining it in place. The retainer assembly 200 may further comprise a locking or rigid latching structure for the threaded groove 250(1) for securing the audiophone 205 including the flexible audio cord 225 and/or the headphone(s) 230 together with the device body 210 of the hand-held, portable electronic device 100. As one example, the locking latching structure for the threaded groove 250(1) may be formed by adapting a typical rubber-based covering knob generally used in many cell phones to cover a headphone and/or microphone port to hold the audiophone 205 including the flexible audio cord 225 and/or the headphone(s) 230 externally over the device housing 215.

According to one embodiment on the present invention, a first and/or a second latch 260 (1,2) may be mounted on the device housing 215, for example, on a narrow flat side of the device body 210 of the hand-held, portable electronic device 100. The first latch 260 (1) may be adapted to hold the flexible audio cord 225 associated with the audiophone 205 and the second latch 260(2) may be adapted to hold the second cord end 235b on the connector pin side. In this way, the retainer assembly 200 may removably retain the audiophone 205 capable of coupling for communicating with the hand-held, portable electronic device 100a as a pair together for storage and reuse. That is, by using the surface 220 of the device housing 215 and/or the device body 210 of the hand-held, portable electronic device 100a, the retainer assembly 200 may removably store an attachable pair of headphones 230 along with an audio and/or video player capable of storing and playing MP3 music files and/or MPEG video files. Accordingly, the retainer assembly 200 may externally store the headphones 230 over the surface 220 of the device housing 215 and/or internally on the device body 210 of the hand-held, portable electronic device 100.

Persons of ordinary skill in the pertinent art would appreciate that for forming the retainer assembly 200 one or a combination of several material(s) may be used such as those used to fabricate the device housing 215 and/or the device body 210 of the hand-held, portable electronic device 100a. However, it is to be understood that a host of shapes and sizes may be obtained for the retainer assembly 200 based on a particular, functionality, dimensions of the shape and/or size of the hand-held, portable electronic device 100a and in accordance with dimensions of the shape and size of the flexible audio cord 225 of the audiophone 205. Examples of the material that may be used to form the retainer assembly 200 include plastic, rubber, metal, and alloys. For example, polycarbonate, aluminum, aluminum alloy, magnesium may be employed for providing a lightweight and slim or ultra slim design with a compact structure to the retainer assembly 200.

Figure 3:
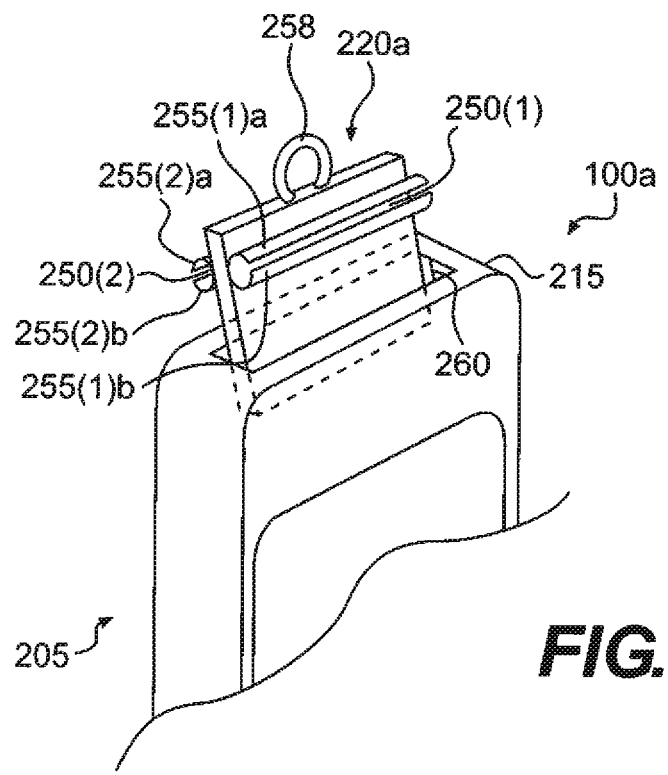
FIG. 3 illustrates a perspective view of a retractable retainer assembly for removably holding an attachable audiophone capable of coupling for communicating with the hand-held, portable electronic device shown in FIG. 2 consistent with one embodiment of the present invention.

In an alternative embodiment, FIG. 3, a perspective view of a retractable retainer assembly 220a illustrates removably holding an attachable audiophone (not shown) capable of coupling for communicating with the hand-held, portable electronic device 100a shown in FIG. 2 consistent with one embodiment of the present invention. The retractable retainer assembly 220a may comprise a retractable cord holder 258 having one or more rails 260 operable for mounting in the device housing 215. The retractable cord holder 258 may include one or more threaded grooves 250 on a distil end for receiving the flexible audio cord 225 associated with the audiophone 205. A user may reel the flexible audio cord 225 over the retractable retainer assembly 220a. In this manner, once reeled and retained by at least one of the two threaded grooves 250(1,2) with the pair of opposing notches 255(1)a, 255(1)b and/or 255(2)a, 255(2)b, the retractable retainer assembly 220a may be operable for disposing the flexible audio cord 225 reeled over thereon within the device housing 215.

Figure 4:
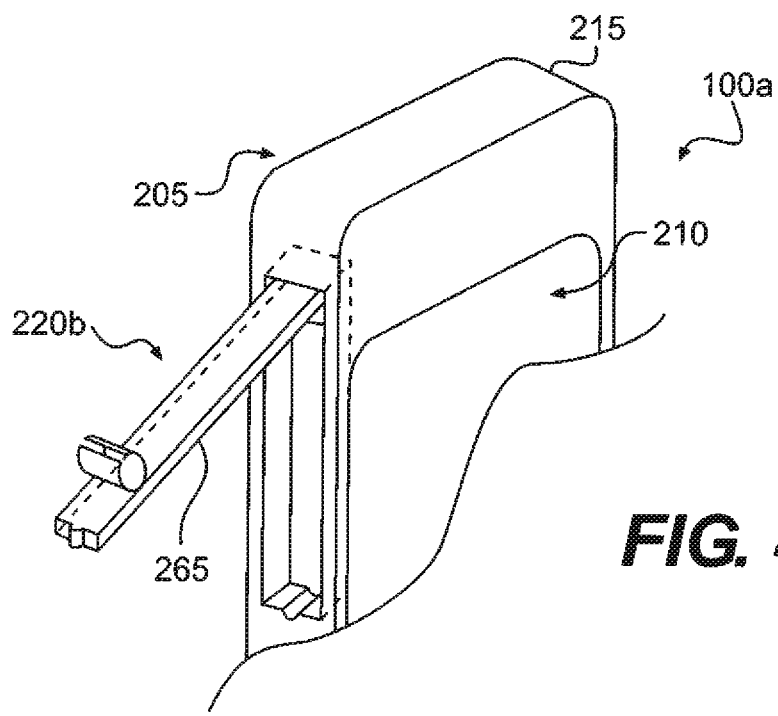
FIG. 4 illustrates a perspective view of a piovtable retainer arm assembly for removably holding an attachable audiophone capable of coupling for communicating with the hand-held, portable electronic device shown in FIG. 2 consistent with one embodiment of the present invention.

According to another alternative embodiment of the present invention, FIG. 4, a perspective view of a piovtable retainer assembly 220b illustrates removably holding an attachable audiophone (not shown) capable of coupling for communicating with the hand-held, portable electronic device shown 110a in FIG. 2. The piovtable retainer assembly 220b comprises an arm 265 pivotably coupled to the device body 210. In this way, the arm 265 may be operable for disposing the flexible audio cord 225 reeled over thereon within the device housing 215.

Figure 5:
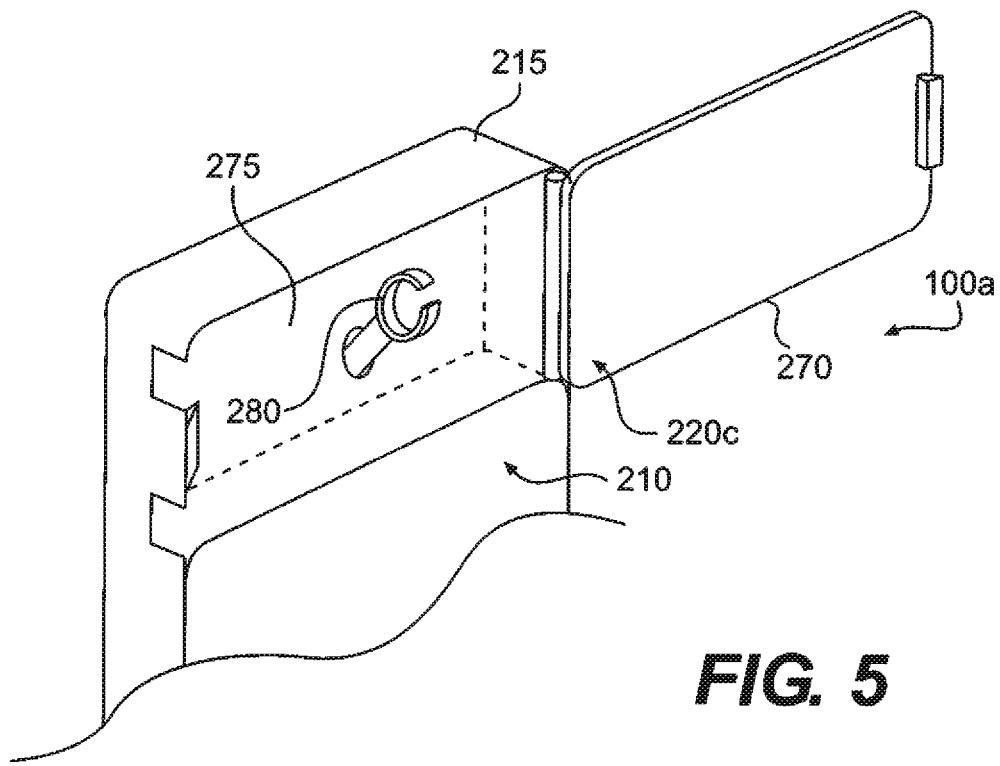
FIG. 5 illustrates a perspective view of a retainer receptacle assembly with a cover for removably holding an attachable audiophone capable of coupling for communicating with the hand-held, portable electronic device shown in FIG. 2 consistent with one embodiment of the present invention.

In accordance with yet another exemplary embodiment of the present invention, FIG. 5, a perspective view of a retainer receptacle assembly 220c with a lid 270 illustrates removably holding the audiophone 205, such as a storable audiophone capable of coupling for communicating with the hand-held, portable electronic device 100a shown in FIG. 2. The retainer receptacle assembly 220c may comprise a receptacle 275 having a post with one or snore threaded notches 280 and the lid 270 coupled to the device body 210 for pivotably closing the device housing 215. The receptacle 275 may be operable for reeling or keeping in the flexible audio cord 225 for storage by housing the flexible audio cord 225 therein with the device body 210 of with the hand-held, portable electronic device 100a.

Figure 6:
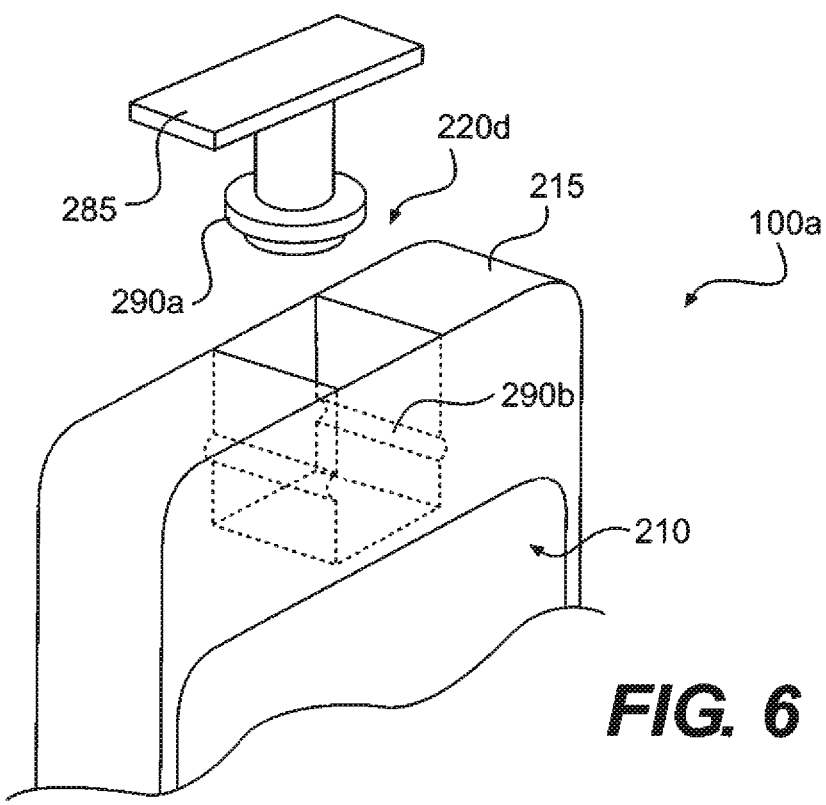
FIG. 6 illustrates a perspective view of an insertable retainer assembly for removably holding an attachable audiophone capable of coupling for communicating with the hand-held, portable electronic device shown in FIG. 2 consistent with one embodiment of the present invention.

In still another illustrative embodiment of the present invention, FIG. 6, a perspective view of an insertable retainer assembly 220d illustrates removably holding the audiophone 205, such as a pluggable audiophone capable of coupling for communicating with the hand-held, portable electronic device 100a shown in FIG. 2. The insertable retainer assembly 220d may comprise a plug 285 having one or more threaded notches 290a and grooves 290b pair for removably mounting on the device body 210. The plug 285 may be operable for inserting the flexible audio cord 225 reeled over thereon within the device housing 215.

Figure 7:
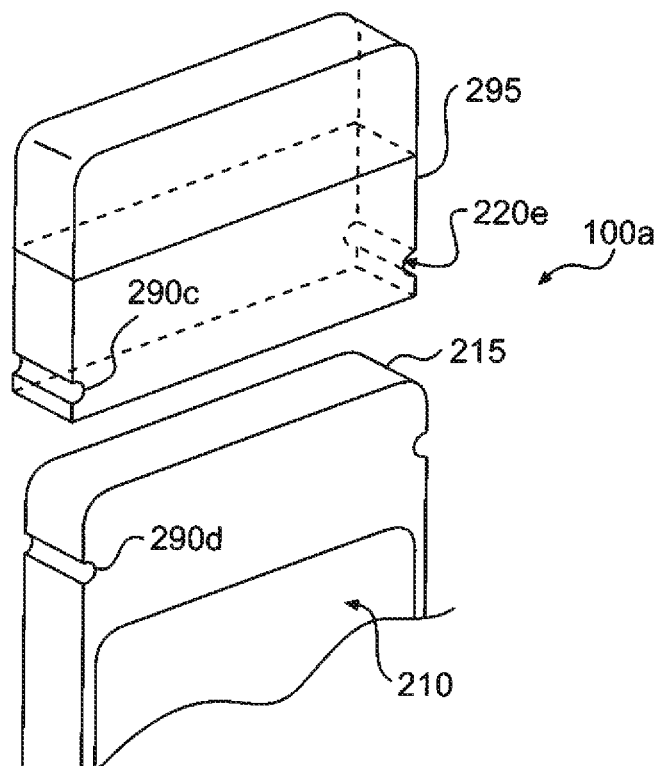
FIG. 7 illustrates a perspective view of a latchable box retainer assembly for removably holding an attachable audiophone capable of coupling for communicating with the hand-held, portable electronic device shown in FIG. 2 consistent with one embodiment of the present invention.

Consistent with one another embodiment of the present invention. FIG. 7, a perspective view of a latchable box retainer assembly 220e illustrates removably holding a storable audiophone capable of coupling for communicating with the hand-held, portable electronic device 100a shown in FIG. 2. The latchable box retainer assembly 220e may comprise a box 295 having one or more threaded notches 290c and grooves 290d pair for removably mounting on the device body 210. The box 295 may be operable for mounting on the device housing 215 to store the flexible audio cord 225 housed therein with the device body 210.

Figure 8:
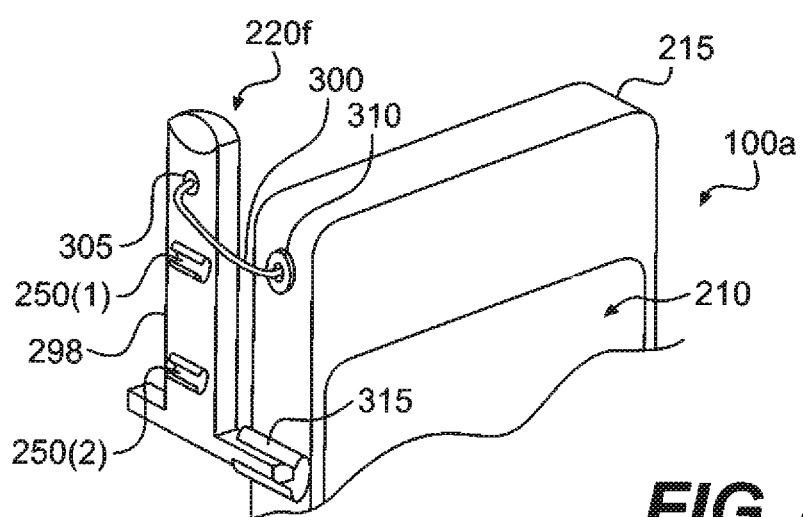
FIG. 8 illustrates a perspective view of a tethered retainer assembly for removably holding an attachable audiophone capable of coupling for communicating with the hand-held, portable electronic device shown in FIG. 2 consistent with one embodiment of the present invention.

FIG. 8 illustrates a perspective view of a tethered retainer assembly 220f for removably holding a luggable audiophone capable of coupling for communicating with the hand-held, portable electronic device 110a shown in FIG. 2 based on one further embodiment of the present invention. The tethered retainer assembly 220f comprises a member 298 having one or more threaded grooves, such as 250(1,2). A tether 300 movably couples the member 298 having a hinge or a first loop 305 to the device housing 215 at a hinge or a second loop 310. The member 298 removably receives the flexible audio cord 225 associated with the audiophone 205. In some embodiments, the tethered retainer assembly 220f may further comprise a latch 315 disposed on the device housing 215. The latch 315 may be adapted to hold the member 298 with the device body 210 of the hand-held, portable electronic device 100a.

Figure 9:
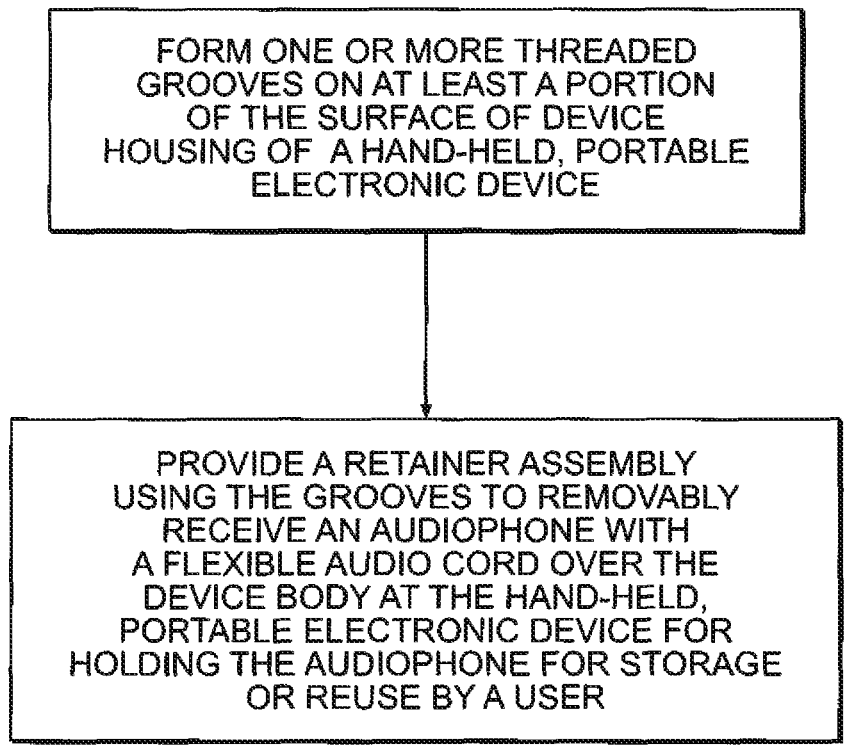
FIG. 9 illustrates a stylized representation for implementing a method for providing a retainer assembly to retain an audiophone including at least one of a headphone and a microphone on the hand-held, portable electronic device having device body and device housing with a surface shown in FIG. 2 consistent with an exemplary embodiment of the present invention.

Turning now to FIG. 9, which schematically illustrates a stylized representation for implementing a method for providing the retainer assembly 220 to retain the audiophone 205 on the hand-held, portable electronic device 100a itself, consistent with an exemplary embodiment of the present invention. At block 320, the method comprise forming one or more threaded grooves 250 on at least the portion 245 of the surface 200 of the device housing 215 for the retainer assembly 220 to removably receive for holding the audiophone 205 over the device body along with the flexible audio cord 225. In this way, by using the one or more threaded grooves 250, the retainer assembly 220 may removably receive the audiophone 205 for retaining it over the device body together with the flexible audio cord 225. According to various embodiments of the retainer assembly 220 including the shown structures 220a-220f may be formed, molded, manufactured, assembled or fabricated, as illustrated in FIGS. 2 to 8. For example, the retainer assembly structures 220a-220f may be obtained by using one or more material(s) in a combination as described above based on a specific application and with desired dimensions.

Portions of the present invention and corresponding detailed description are presented in terms of physical and symbolic representations of components. These descriptions and representations are the ones by which those of ordinary skill in the art effectively convey the substance of their work to others of ordinary skill in the art. It should be borne in mind, however, that all of these and similar components are to be associated with the appropriate physical quantities and are merely convenient labels applied to these structures.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A mobile telecommunication device comprising:
   at least one of a cellular transceiver,
      a short-range wireless transceiver,
      one or more processors,
      a flash memory to store user data and user applications (APPs),
      an interactive touch screen user interface, and
      a display; and
   a device body including a device housing,
   wherein the device housing including
      a side circumferential housing portion on at least four device edges, and
      front, back surfaces,
   wherein the device housing having
   a first gap formed by first two opposing surfaces such that the first gap being formed between the front surface and the back surface in the side circumferential housing portion of the device housing and straight across the side circumferential housing portion of one device edge of the at least four device edges and
   a second gap formed by second two opposing surfaces such that the second gap being formed between the front surface and the back surface in the side circumferential housing portion of the device housing and straight across the side circumferential housing portion of another device edge of the at least four device edges, different than the one device edge,
   wherein the device housing having
   a first portion thereof associated with the first gap such that the first portion of the device housing separates the first two opposing surfaces to enable use of the first gap and
   a second portion thereof associated with the second gap such that the second portion of the device housing separates the second opposing surfaces to enable use of the second gap,
   wherein the first, second gaps and first, second portions of the device housing jointly define at least one of a shape and a size of a predefined geometric structure that is selected to externally form a functional device hardware element of the mobile telecommunication device from the side circumferential housing portion of the device housing,
   wherein the predefined geometric structure having sufficient structure to provide the complete functionality for the functional device hardware element.

2. The mobile telecommunication device of claim 1, wherein the second gap is substantially similar to the first gap and the one and another device edges are substantially flat.

3. The mobile telecommunication device of claim 2, wherein the first and second gaps are substantially straight and uniform along a longitudinal direction of the first and second gaps.

4. The mobile telecommunication device of claim 3, wherein the first gap having a first shape, length and orientation and the second gap having a second shape, length and orientation such that the first shape, length and orientation is substantially similar to the second shape, length and orientation.

5. The mobile telecommunication device of claim 1, wherein the second gap is disposed on the opposing side from the first gap on the side circumferential housing portion.

6. The mobile telecommunication device of claim 1, wherein the first gap provides a first cord receptacle that securely holds a flexible audio cord of an audiophone of the mobile telecommunication device.

7. The mobile telecommunication device of claim 6, wherein the second gap provides a second cord receptacle that securely holds the flexible audio cord.

8. The mobile telecommunication device of claim 7, wherein the first and second cord receptacles each having a pair of opposing notches to latch the flexible audio cord.

9. The mobile telecommunication device of claim 1, wherein the one device edge is on the opposing side from the another device edge and substantially facing the another device edge and wherein at least two device edges of the at least four device edges are relatively longer in length than at least two another device edges of the at least four device edges.

10. A method of externally providing a device functionality in a mobile telecommunication device, the method comprising:
providing at least one of a cellular transceiver, a short-range wireless transceiver, one or more processors, a flash memory to store user data and user applications (APPs), an interactive touch screen user interface, and a display; and
providing a device body including a device housing, wherein the device housing including a side circumferential housing portion on at least four device edges, and front, back surfaces;
providing a first gap formed by first two opposing surfaces in the side circumferential housing portion of the device housing and straight across the side circumferential housing portion of one device edge of the at least four device edges, wherein the first gap being formed between the front surface and the back surface; and
providing a second gap formed by second two opposing surfaces in the side circumferential housing portion of the device housing and straight across the side circumferential housing portion of another device edge of the at least four device edges, different than the one device edge, wherein the second gap being formed between the front surface,
wherein the device housing having
a first portion thereof associated with the first gap such that the first portion of the device housing separates the first two opposing surfaces to enable use of the first gap and
a second portion thereof associated with the second gap such that the second portion of the device housing separates the second two opposing surfaces to enable use of the second gap,
wherein the first, second gaps and first, second portions of the device housing jointly define at least one of a shape and a size of a predefined geometric structure that is selected to externally form a functional device hardware element of the mobile telecommunication device from the side circumferential housing portion of the device housing,
wherein the predefined geometric structure having sufficient structure to provide the complete functionality for the functional device hardware element.

11. The method of claim 10, wherein the second gap is substantially similar to the first gap and the one and another device edges are substantially flat.

12. The method of claim 11, wherein the first and second gaps are substantially straight and uniform along a longitudinal direction of the first and second gaps.

13. The method of claim 12, wherein the first gap having a first shape, length and orientation and the second gap having a second shape, length and orientation such that the first shape, length and orientation is substantially similar to the second shape, length and orientation.

14. The method of claim 10, wherein the second gap is disposed on the opposing side from the first gap on the side circumferential housing portion.

15. The method of claim 10, wherein the first gap provides a first cord receptacle that securely holds a flexible audio cord of an audiophone of the mobile telecommunication device.

16. The method of claim 15, wherein the second gap provides a second cord receptacle that securely holds the flexible audio cord.

17. The method of claim 16, wherein the first and second cord receptacles each having a pair of opposing notches to latch the flexible audio cord.

18. The method of claim 10, wherein the one device edge is on the opposing side from the another device edge and substantially facing the another device edge and wherein at least two device edges of the at least four device edges are relatively longer in length than at least two another device edges of the at least four device edges.

19. A cellular mobile telecommunication device comprising:
a device body; and
a device housing,
wherein the device housing including
a substantially flat side circumferential housing portion on at least four device edges, and
front, back surfaces,
wherein the device housing having
a substantially straight and uniform first gap formed by first two opposing surfaces such that the first gap being between the front surface and the back surface in the side circumferential housing portion and straight across the side circumferential housing portion of a first device edge of the at least four device edges at a first location in a first orientation relative to the first device edge and
a substantially straight and uniform second cap formed by second two opposing surfaces such that the second gap being formed between the front surface and the back surface in the side circumferential housing portion and straight across the side circumferential housing portion of a second device edge of the at least four device edges at a second location in a second orientation relative to the second device edge, different than the first device edge such that a combination of the first, second locations and the first, second orientations of the first and second substantially straight and uniform gaps, respectively are configured and arranged to separate the side circumferential housing portion on the first and second device edges in two portions,
wherein the device housing having
a first portion thereof associated with the first substantially straight and uniform gap such that the first portion of the device housing separates the first two opposing surfaces to enable use of the first substantially straight and uniform gap and
a second portion thereof associated with the second substantially straight and uniform gap such that the second portion of the device housing separates the second two opposing surfaces to enable use of the second substantially straight and uniform gap,
wherein the first, second substantially straight and uniform gaps and first, second portions of the device housing to jointly define at least one of a shape and a size of a predefined geometric assembly that is selected to provide an externally disposed device hardware element of the cellular mobile telecommunication device using only the side circumferential housing portion of the device housing, wherein the predefined geometric assembly having sufficient structure to provide the complete functionality for the externally disposed device hardware element.

20. The cellular mobile telecommunication device of claim 19 further comprising at least one of:
a cellular transceiver;
a short-range wireless transceiver;
a processor;
a flash memory to store user data and user applications (APPs);
an interactive touch screen user interface; and
a display, wherein the cellular mobile telecommunication device is a cell phone.

21. The cellular mobile telecommunication device of claim 20, wherein the first portion of the device housing is configured to complete the first substantially straight and uniform gap and wherein the second portion of the device housing is configured to complete the second substantially straight and uniform gap such that the complete functionality for the externally disposed device hardware element is provided.

22. The cellular mobile telecommunication device of claim 21, wherein the first substantially straight and uniform gap having a first longitudinal axis such that the first portion of the device housing is disposed along the first longitudinal axis and the second substantially straight and uniform gap having a second longitudinal axis such that the second portion of the device housing is disposed along the second longitudinal axis.

23. The cellular mobile telecommunication device of claim 22, wherein the first and second longitudinal axes are normal to a thickness direction of the device body from the front and back surfaces of the device housing of the cellular mobile telecommunication device.

24. A method of externally providing a device functionality in a cellular mobile telecommunication device, the method comprising:
providing a device body;
providing a device housing, wherein the device housing including
a substantially flat side circumferential housing portion on at least four device edges, and
front, back surfaces;
providing a substantially straight and uniform first gap formed by first two opposing surfaces in the side circumferential housing portion and straight across the side circumferential housing portion of a first device edge of the at least four device edges at a first location in a first orientation relative to the first device edge, wherein the substantially straight and uniform first gap being formed between the front surface and the back surface; and
providing a substantially straight and uniform second gap formed by second two opposing surfaces in the side circumferential housing portion and straight across the side circumferential housing portion of a second device edge of the at least four device edges at a second location in a second orientation relative to the second device edge, different than the first device edge, wherein the substantially straight and uniform second gap being formed between the front surface and the back surface such that a combination of the first, second locations and the first, second orientations of the first and second substantially straight and uniform, respectively are configured and arranged to separate the side circumferential housing portion on the first and second device edges in two portions, wherein the device housing having
a first portion thereof associated with the first substantially straight and uniform gap such that the first portion of the device housing separates the first two opposing surfaces to enable use of the first substantially straight and uniform gap and
a second portion thereof associated with the second substantially straight and uniform gap such that the second portion of the device housing separates the second two opposing surfaces to enable use of the second substantially straight and uniform gap, wherein the first, second substantially straight and uniform gaps and first, second portions of the device housing to jointly define at least one of a shape and a size of a predefined geometric assembly that is selected to provide an externally disposed device hardware element of the cellular mobile telecommunication device using only the side circumferential housing portion of the device housing, wherein the predefined geometric assembly having sufficient structure to provide the complete functionality for the externally disposed device hardware element.

25. The method of claim 24, wherein the cellular mobile telecommunication device of claim 24 further comprising at least one of:
a cellular transceiver;
a short-range wireless transceiver;
a processor;
a flash memory to store user data and user applications (APPs);
an interactive touch screen user interface; and
a display, wherein the cellular mobile telecommunication device is a cell phone.

26. The method of claim 25, wherein the first portion of the device housing is configured to complete the first substantially straight and uniform gap and wherein the second portion of the device housing is configured to complete the second substantially straight and uniform gap such that the complete functionality for the externally disposed device hardware element is provided.

27. The method of claim 26, wherein the first substantially straight and uniform gap having a first longitudinal axis such that the first portion of the device housing is disposed along the first longitudinal axis and the second substantially straight and uniform gap having a second longitudinal axis such that the second portion of the device housing is disposed along the second longitudinal axis.

28. The method of claim 27, wherein the first and second longitudinal axes are normal to a thickness direction of the device body from the front and back surfaces of the device housing of the cellular mobile telecommunication device.

29. The mobile telecommunication device of claim 1, wherein the first portion of the device housing is configured to complete the first gap and wherein the second portion of the device housing is configured to complete the second gap such that the complete functionality for the functional device hardware element is provided.

30. The mobile telecommunication device of claim 29, wherein the first gap having a first longitudinal axis such that the first portion of the device housing is disposed along the first longitudinal axis and the second gap having a second longitudinal axis such that the second portion of the device housing is disposed along the second longitudinal axis.

31. The mobile telecommunication device of claim 30, wherein the first and second longitudinal axes are normal to a thickness direction of the device body from the front and back surfaces of the device housing of the mobile telecommunication device.

32. The method of claim 10, wherein the first portion of the device housing is configured to complete the first gap and wherein the second portion of the device housing is configured to at least one of complete the second gap such that the complete functionality for the functional device hardware element is provided.

33. The method of claim 32, wherein the first gap having a first longitudinal axis such that the first portion of the device housing is disposed along the first longitudinal axis and the second gap having a second longitudinal axis such that the second portion of the device housing is disposed along the second longitudinal axis.

34. The method of claim 33, wherein the first and second longitudinal axes are normal to a thickness direction of the device body from the front and back surfaces of the device housing of the mobile telecommunication device.

\* \* \* \* \*